(12) United States Patent
Douglass

(10) Patent No.: US 10,991,035 B2
(45) Date of Patent: Apr. 27, 2021

(54) LISTING AND LOCATION APPLICATION

(71) Applicant: Drinda Douglass, Vancouver, WA (US)

(72) Inventor: Drinda Douglass, Vancouver, WA (US)

( * ) Notice: Subject to any disclaimer, the term of this patent is extended or adjusted under 35 U.S.C. 154(b) by 0 days.

(21) Appl. No.: 16/850,213

(22) Filed: Apr. 16, 2020

(65) Prior Publication Data
US 2020/0242683 A1    Jul. 30, 2020

Related U.S. Application Data

(60) Provisional application No. 62/913,532, filed on Oct. 10, 2019.

(51) Int. Cl.
| | |
|---|---|
| *G06Q 30/00* | (2012.01) |
| *G06Q 30/06* | (2012.01) |
| *H04W 4/021* | (2018.01) |
| *H04W 4/33* | (2018.01) |
| *H04W 4/024* | (2018.01) |

(52) U.S. Cl.
CPC ..... *G06Q 30/0639* (2013.01); *G06Q 30/0633* (2013.01); *H04W 4/021* (2013.01); *H04W 4/024* (2018.02); *H04W 4/33* (2018.02)

(58) Field of Classification Search
None
See application file for complete search history.

(56) References Cited

U.S. PATENT DOCUMENTS

| | | |
|---|---|---|
| 3,060,412 A1 | 11/2011 | Rosenbaum et al. |
| 8,401,915 B1 | 3/2013 | Kim |
| 8,620,772 B2 | 12/2013 | Owen |
| 2005/0125386 A1 | 6/2005 | Diebold |
| 2011/0251897 A1* | 10/2011 | Litvack ............. G06Q 30/0277 |
| | | 705/14.58 |
| 2012/0023034 A1 | 1/2012 | Lynch et al. |
| 2013/0332273 A1 | 12/2013 | Gu et al. |
| 2017/0046771 A1* | 2/2017 | Cropp, Jr. .......... G06Q 30/0639 |
| 2018/0284955 A1* | 10/2018 | Canavor ................ G06F 16/29 |

OTHER PUBLICATIONS https://orlandoairports.net/app/, Your Personal MCO Assistant, Found: Apr. 2020, copyright © 2017 Greater Orlando Aviation Authority.

* cited by examiner

*Primary Examiner* — Mila Airapetian
(74) *Attorney, Agent, or Firm* — IP Works PLLC

(57) ABSTRACT

A listing and locating application is shown and described. The listing and locating application will allow for products to be listed within a listing function. The application will be able to share lists among allowed users. The application will have a GPS system that will allow for the application to display localized maps. The localized maps will display the exact locations of products on the list. The products on the list will be correlated with coupons form the merchant shop. The application further will be enabled to display a direction to locate a specific area or the most direct route through a localized area.

13 Claims, 10 Drawing Sheets

LISTING AND LOCATION APPLICATION

CROSS REFERENCE TO RELATED APPLICATIONS

This application claims the benefit of U.S. Provisional Application No. 62/913,532 filed on Oct. 10, 2019. The above identified patent application is herein incorporated by reference in its entirety to provide continuity of disclosure.

BACKGROUND OF THE INVENTION

The present invention relates to a listing and location application. More particularly, the present invention provides a listing application that can direct a user to the exact location of an item within a store.

The number of individuals shopping in brick and mortar stores has taken a tremendous dip in view of the rise of internet based companies. These companies have made it extremely easy to locate and purchase products. Many times, the products arrive within only a few days span. These online shops do have the drawback of having to ship items back to the store for a return.

Further, many individuals have difficulty navigating spaces, such as indoor spaces of markets, hospitals, office buildings, and other structures, and may also struggle navigating outdoor spaces such as transportation terminals. These individuals may rely on computing devices, such as mobile phones, to navigate to the space, but once they reach the space, they may become disoriented or otherwise have difficulty finding what they are looking for, such as particular items within the space, as may occur during a shopping trip. In such scenarios, it may be desirable to be able to navigate these spaces through assistance of the mobile phone.

While online shops have the ability to track shopping trends, merchandise sold, and various website metrics, physical store lack many of these same capabilities. This makes it even more difficult for physical location merchants to compete with online marketing and sales forces due to this lack of information. It can be extremely difficult to run the proper ads and have proper product placement without metrics to help ensure that the target audience is being hit.

Consequently, there is a need for an improvement in the art of in person shopping or small area navigation. The present invention substantially diverges in design elements from the known art while at the same time solves a problem many people face when shopping or attempting to find a location. In this regard the present invention substantially fulfills these needs.

SUMMARY OF THE INVENTION

The present invention provides a listing and location application wherein the same can be utilized for providing convenience for the user when shopping in a physical location. The method for a listing and location application comprising listing products. Then receiving a location from a GPS system. Next, the method activates a merchant shop map based on the GPS system location. The product locations be displayed, wherein the products are those on the list.

Another object of the method for a listing and location application method is to include the step of correlating coupons relating to the products added to the list.

Another object of the method for a listing and location application method is to include the step of calculating a best route through the merchant shop to collect the listed products. Then displaying the best route on the product location display.

Another object of the method for a listing and location application method is to include the step of associating the list with a specific merchant shop.

Another object of the method for a listing and location application method is to include the step of sharing the list with an allowed party.

Another object of the method for a listing and location application method is to include the step of recording the path through a specific merchant shop.

Another object of the method for a listing and location application method is to include the step of displaying a correlation of traffic through a merchant shop to an allowed user.

Another object of the method for a listing and location application method is to include the step of receiving a search request to locate a specific item. Then displaying the location of the searched item.

Another object of the present invention is to provide a method for a locating application comprising receiving a location from a GPS system and displaying a localized map of the received location. Upon receiving a request to locate a specific location within the localized map, the method displays a route to the requested location.

Another object of the method for a listing and location application method is to provide a localized map of a building layout.

Another object of the method for a listing and location application method is to provide a localized map of a campus and of specific building layouts within the campus.

Another object of the method for a listing and location application method is to include the step of a calculating the optimal route to the requesting location.

Another object of the method for a listing and location application method is to provide a localized map that will have sensitive areas redacted.

Another object of the method for a listing and location application method is to include the step of displaying notifications pertaining to the localized map.

Another object of the method for a listing and location application method is to provide a localized map which displays locations of interest.

Another object of the present invention is to provide a listing and location application comprising a listing function, wherein a list of products is entered and stored. A location program that displays localized locations within the application. Further, a correlation system that will receive a location from a GPS system and display a correlated map.

Another object of the listing and location application is to provide the ability to share lists with a cloud storage system.

Another object of the listing, and location application is to provide different allowed users have access to the lists.

Another object of the listing and location application is to provide the localized map shows areas of interest.

Another object of the listing, and location application is to provide the localized map shows product locations based on the list.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a chart of an embodiment of connections of a system for the listing and location application to run on.

DETAILED DESCRIPTION OF THE INVENTION

Figure 1:
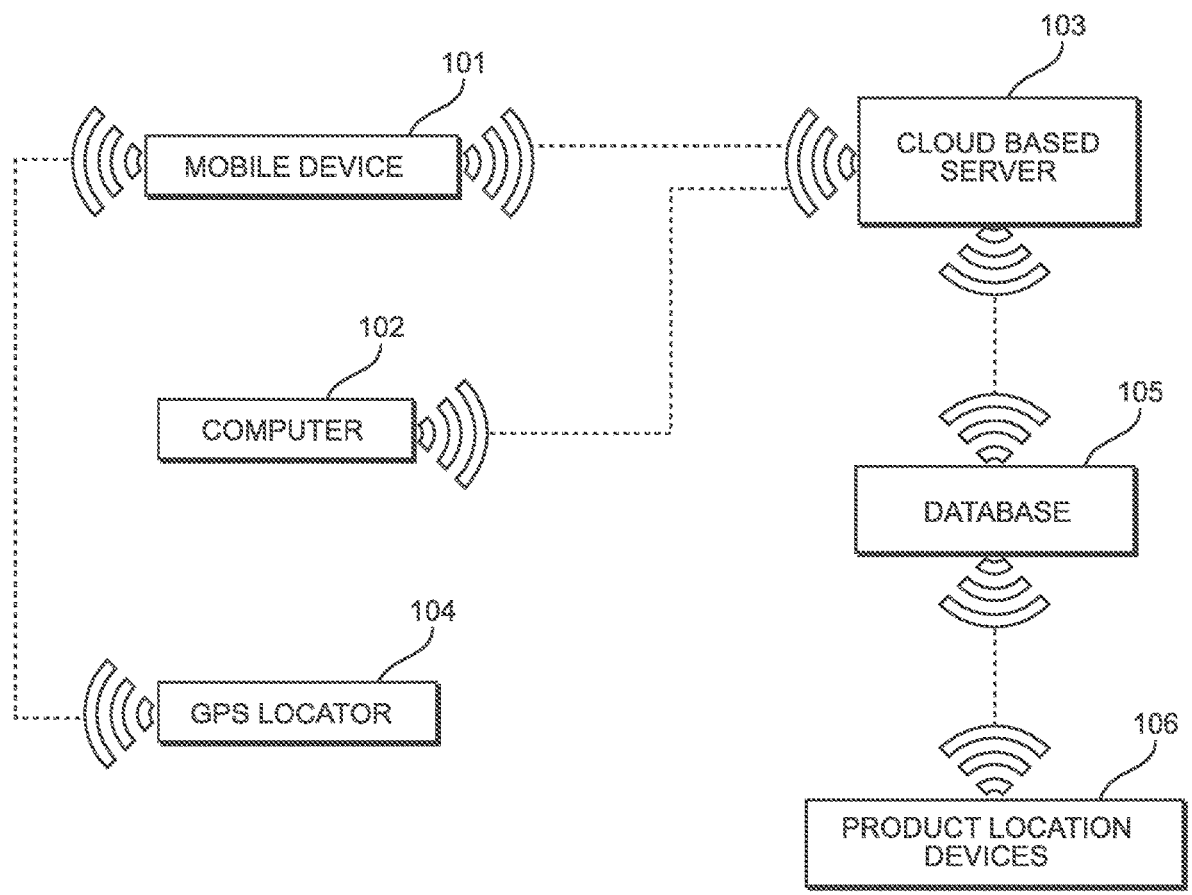

Reference is made herein to the attached drawings. Like reference numerals are used throughout the drawings to depict like or similar elements of the listing and location application. For the purposes of presenting a brief and clear description of the present invention, a preferred embodiment will be discussed as used for the listing and location application. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

Discussed through is a GPS locator, GPS system, or other references to a GPS. A GPS in this application is not solely meant to be defined as a Global Positioning System. A GPS may also be beacons, a Bluetooth system, an RFID system, A WiFi system, and other location based technologies. Nothing in this application is meant to be limited to a specific type of location system or technology.

Referring now to FIG. 1, there is shown a chart of an embodiment of connections of a system for the listing and location application to run on. In one embodiment for the application will run on a system having various different connections. The application will run on a mobile device 101. The mobile device 101 is connected to a GPS locator 104. The GPS locator 104 will be able to position the mobile device 101. In further embodiments the application will run on a computer 102. In some embodiments this computer 102 is a laptop. In other embodiments the computer 102 is a PC.

The mobile device 101 and the computer 102 are wirelessly connected to a cloud based server 103, The cloud based server 103 will run at least part of the application thereon. The cloud based server 103 will further allow for cross platform data transfer as described in various embodiments herein. In other embodiments the cloud based server 103 will allow for data analytics to be run as described herein.

In some embodiments there is at least one store database 105 wirelessly attached to the cloud based server 103. The database 105 will hold merchant data. The database 105 will store product locations within the store. In one embodiment the product locations are manually entered into the database 105. In another embodiment the products are associated with a product location device 106. The product location device 106 will connect to the database 105. The product location device 106 will report the exact location of the product within the store to the database 105. This will log the product location for use by the application as described herein.

Figure 2:
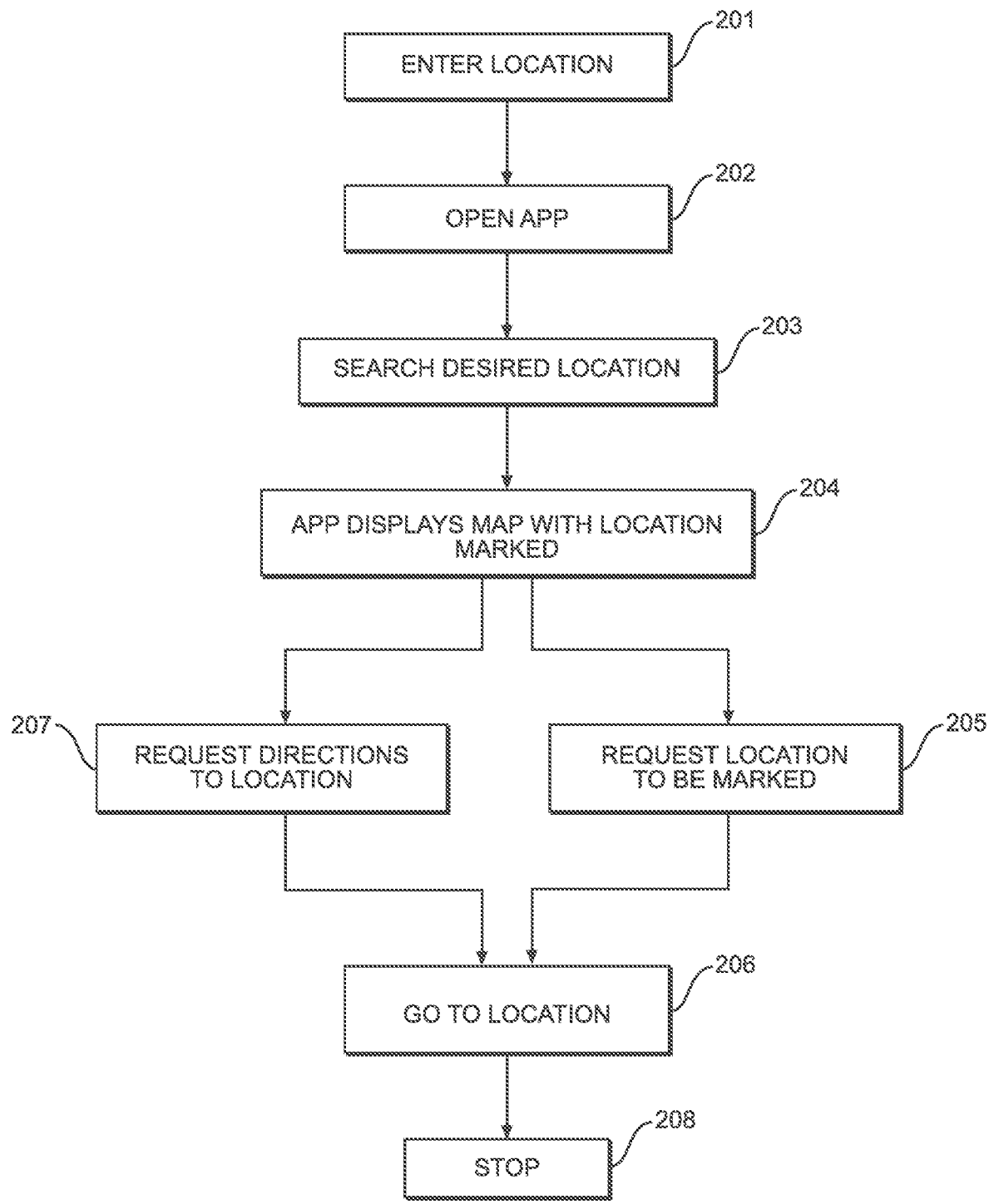
FIG. 2 shows a flow chart of an embodiment of the listing and location system.

Referring now to FIG. 2, there is shown a flow chart of an embodiment of the location system will work. In one embodiment of the application a user will be able to use the application to find a specific location within a localized area. The method for the application will begin when a user enters the desired location 201. The user will then open the application 202. The application will then function as described in FIG. 4 to allow a user to either select a localized location or the app will automatically recognize the location based on a GPS. The user will then search for a desired location 203. Such as a grocery store or medical facility.

The application will then display a map of the localized area 204. The map will have the desired location marked 204. In one embodiment the user selects to leave the location marked 205 and to end process 208. This allow a user to navigate the map and find the desired location 206. In another embodiment the user requests directions to the desired location 207. The application will direct the user to the desired location. In this embodiment the application will be able to direct a user through hallways and store aisles. The application will take the user to the desired location 207 then end 208.

Figure 3:
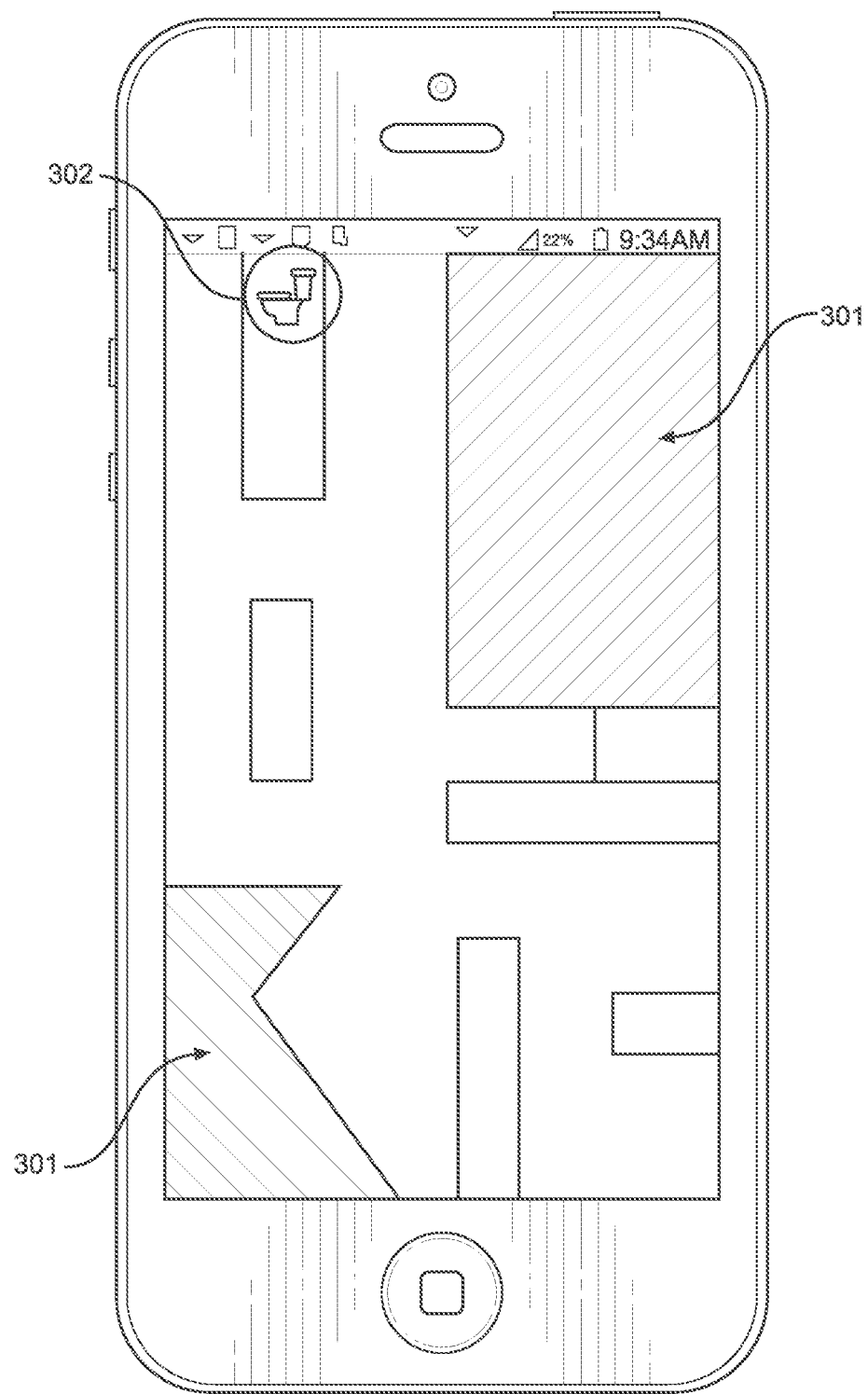
FIG. 3 shows a top down view of an embodiment of the GUI for the location application.

Referring now to FIG. 3, there is shown a top down view of an embodiment of the GUI for the location application. In one embodiment of the location process of the application, the localized map will have redacted areas 301. In one embodiment these areas are redacted for security purposes. For example, an airport may redact office areas to prevent having a map of these areas. This redaction feature will add a level of security to the application.

In some embodiments the redacted areas will be chosen by the company owning the localized area. In other embodiments a security agency will monitor the application redacting areas. This will be useful at school campuses and government buildings. In many embodiments the application will not allow for copying of the displayed map. This means that the application will bar a mobile device from taking a screen shot of the map. In other embodiments the application only shown the map when the user is on location.

The localized map will also show places of interest 302. For example, the localized map may show a bathroom. The localized map may also show a security office. In a mall, for example, the localized map may show the food court as a special location.

Figure 4:
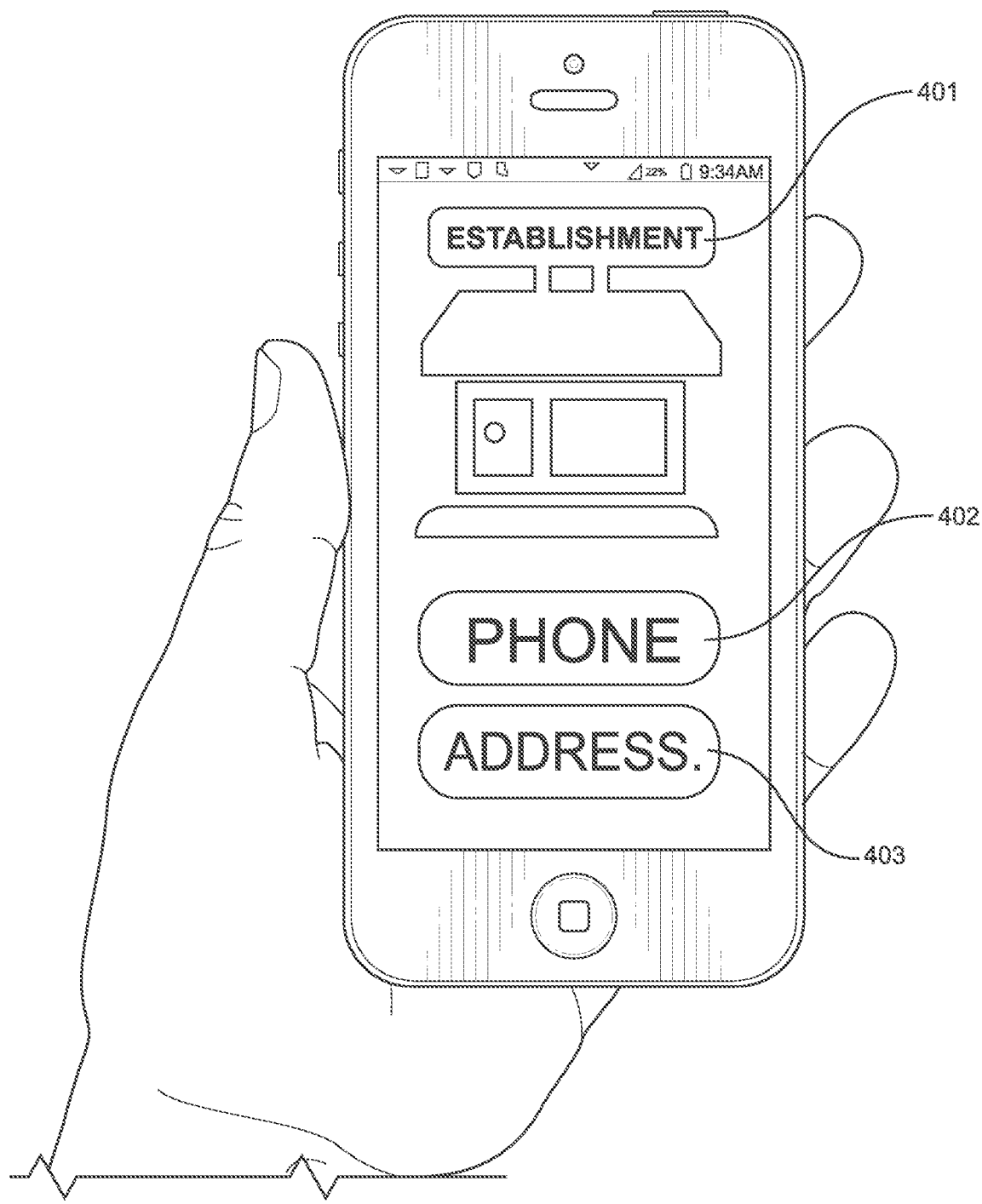
FIG. 4 shows a top down view of an embodiment of the GUI for the location application having a store selection.

Referring now to FIG. 4, there is shown a top down view of an embodiment of the GUI for the location application having a store selection. In one embodiment the application will automatically register the location of the mobile device and display the corresponding localized map. This will allow the application to only show a localized map when the mobile device is on that localized maps location.

In another embodiment a user will be able to select a localized map to show From a list. In one embodiment the list will populate all areas that have localized maps. In another embodiment the list will only populate with stores within an allowable location distance from the mobile device. In yet another embodiment all locations will display. Locations that are not within the allowable location distance will be shown in a distinguishing way from locations which will show localized maps.

Once the location is accepted the application will have an information page. The information page will show the type of area that is displayed 401 by the localized map. For example, in the illustrated embodiment, the type of area displayed 401 is shown as establishment. In one embodiment establishment will read store. In another embodiment establishment will read university. The information page will further display the phone number 402 and the address 403 of the location, in one embodiment when the location is selected from the list and the mobile device is not on the location, the information page will display with an out of location notice. This will allow users to still view location information without being on location.

Figure 5:
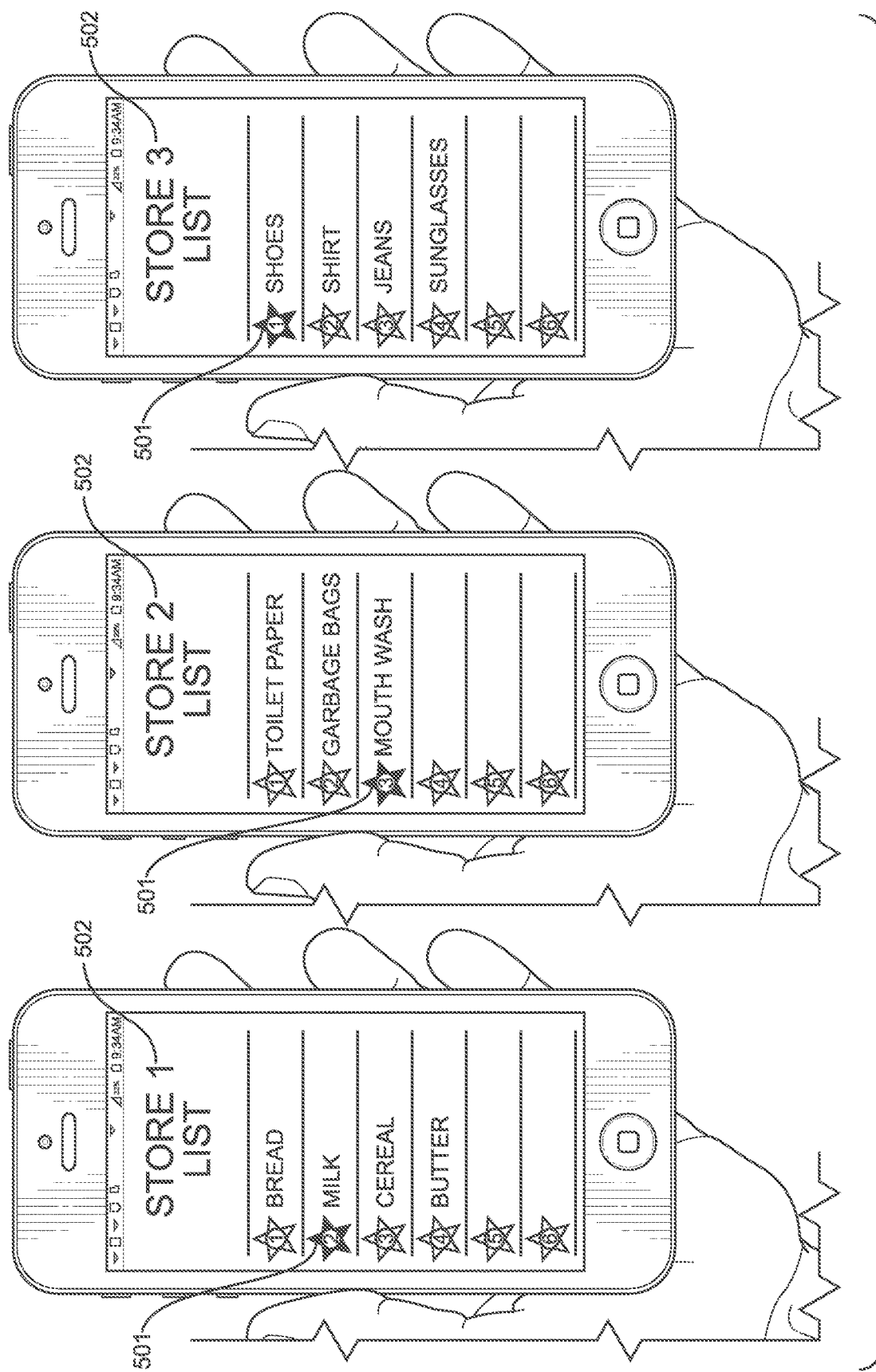
FIG. 5 shows a top down view of an embodiment of the GUI for the listing, and location application for various lists.

Referring now to FIG. 5, there is shown a top down view of an embodiment of the GUI for the listing and location application for various lists. The allocation application will have a listing ability. The application will allow for various lists to be created used and displayed, in one embodiment different lists can be created for selected individual stores 502. In this embodiment items can be added to specific stores from which a user wishes to purchase them from.

In one embodiment the lists will display special markings when a listed item has a coupon. In the shown embodiment the listed item will have a filled in star 501 next to the item with a coupon, in other embodiments the coupons can be shown using any manner of design to standout to the user. In other embodiments the lists will show products on sale.

In different embodiments the lists will be able to be shared amongst different users. In one embodiment users may select other users they wish to share lists with. In some embodiments these users will be able to edit the lists. In other embodiments the allowed users will only be able to view the lists.

Figure 6:
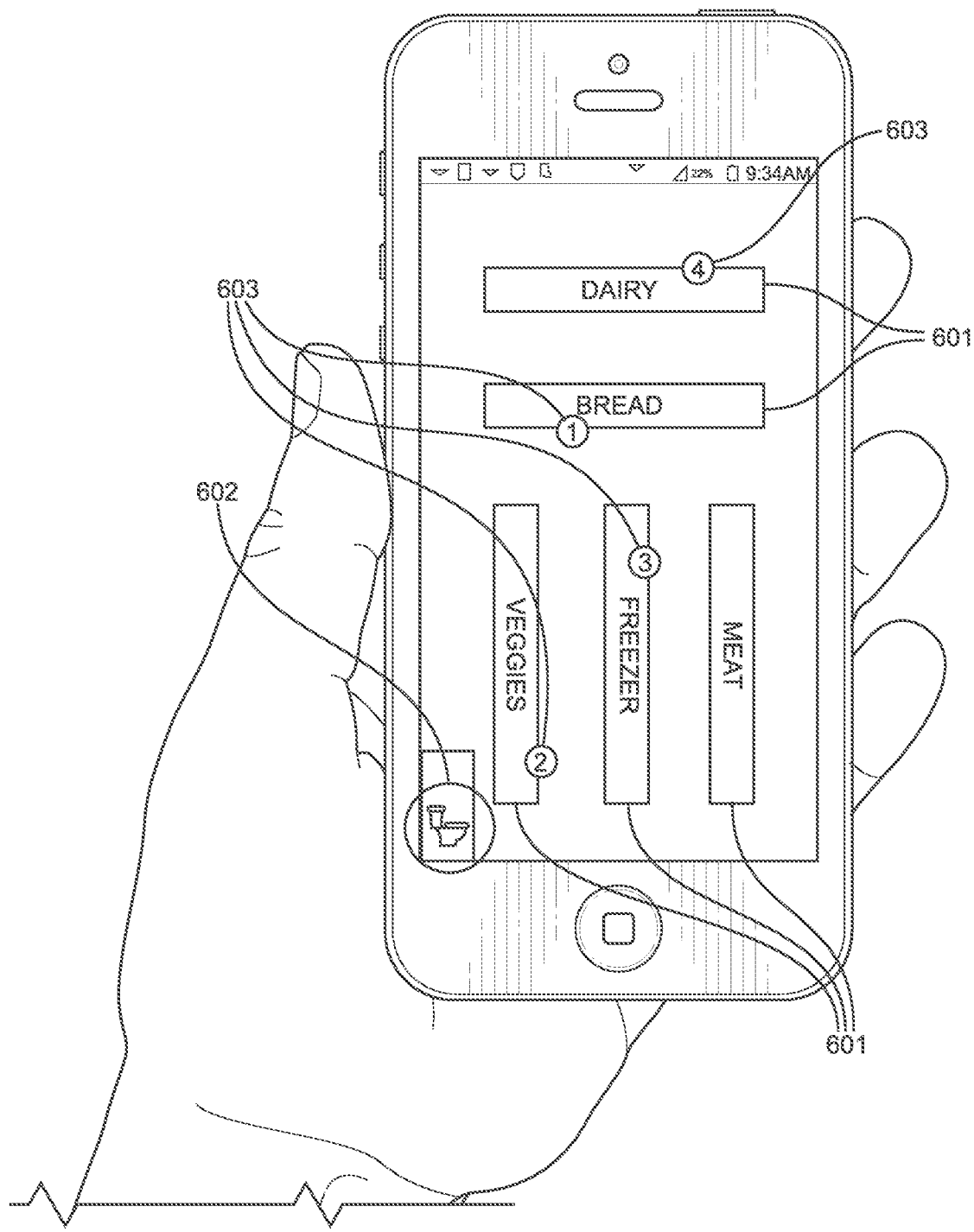
FIG. 6 shows a top down view of an embodiment of the GUI for the location application showing item locations

Referring now to FIG. 6, there is shown a top down view of an embodiment of the GUI for the location application showing item locations. In other embodiments of the location application for shopping the application will show the exact layout of the store. In this embodiment each row of shelving 601 will be shown. This will help a user understand the make up of a store. In this embodiment the map also shows areas of interest 602 within the store. In the shown embodiment an area if interest 602 is a bathroom.

In addition to the location services, the application will provide users the ability to be shown exact locations of goods they wish to purchase. In one embodiment of the application the GUI will display the products as dots 603 within the selected store. The dots 603 will represent product locations. In other embodiments as described below the location of the products will further be correlated to a specific product.

In the shown embodiment there are category labels on the shelving 601. The category labels can help a user to better navigate the location. In another embodiment the labels are placed in the rows between the shelves instead of on the shelving 601. In one embodiment merchants will be able to change the labels as described in the description of FIG. 9.

Figure 7:
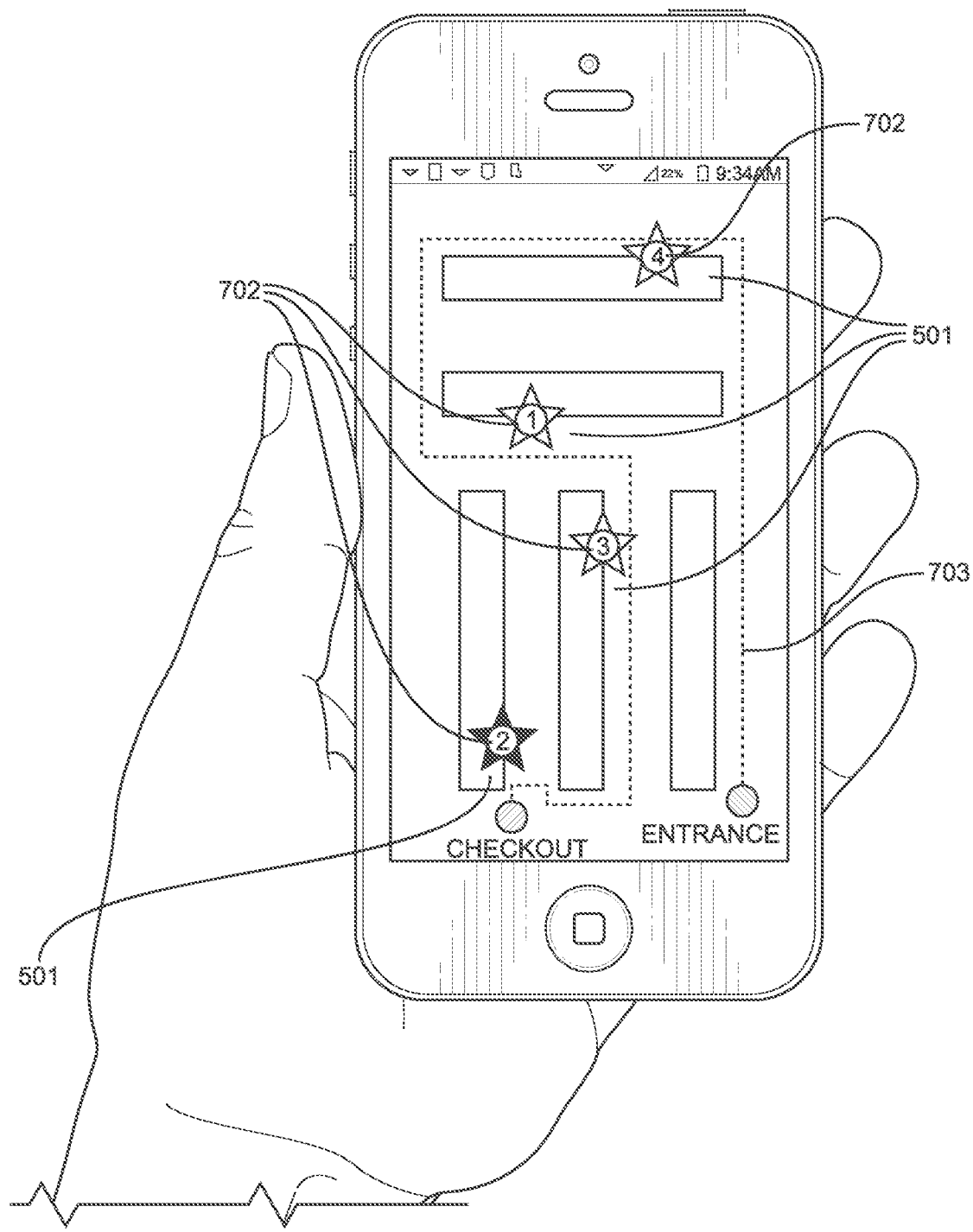
FIG. 7 shows a top down view of an embodiment of the fatal for the location application showing item location and a direction mapping.

Referring now to FIG. 7, there is shown a top down view of an embodiment of the GUI for the location application showing item location and a direction mapping. In the shown embodiment the product location is correlated to a product from a listing feature of the application as described above. The products are shown as stars 501 to differentiate from the dots of the general product locations. In one embodiment there are further numbers 702 located within the stars 501. The numbers 702 will correlate directly to items from a list of the specific store. In the shown embodiment one of the stars 502 is colored in. This shows that the item has a coupon correlated with that item.

Further shown in this embodiment of the GUI is a product mapping feature. In one embodiment the application will take items from a list and chart a best route 703 through a store. The best route 703 will chart a best route through a store to acquire all of the products without having to back track or enter the same area of the store more than once. This feature will allow a user to efficiently enter a store, collect all of the desired products, and exit the store in an efficient manner.

Figure 8:
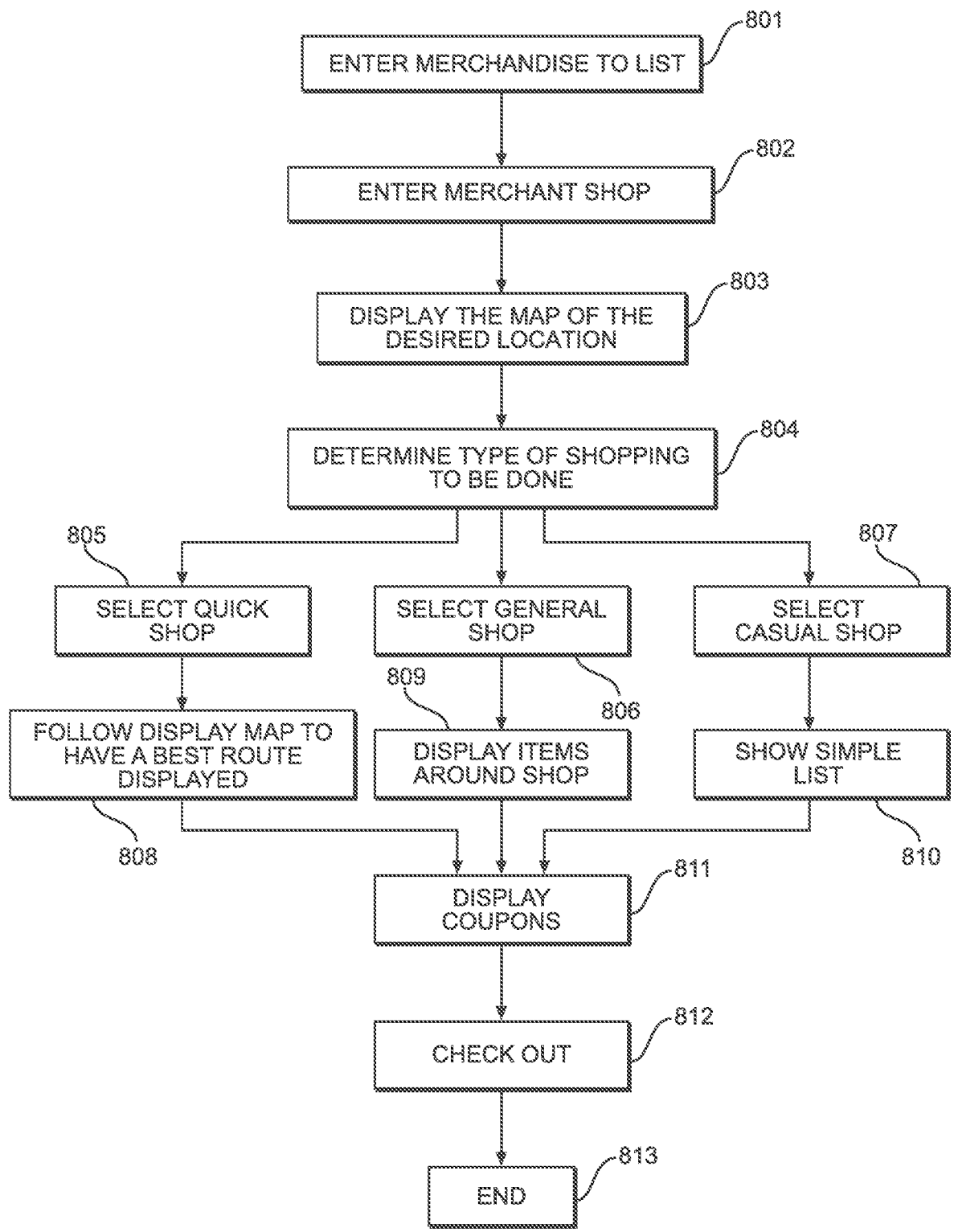
FIG. 8 shows a chart of an embodiment of the use of the list and location application for shopping.

Referring now to FIG. 8, there is shown a chart of an embodiment of the use of the list and location application for shopping. In some embodiments a method for using the location application begins when a user enters merchandise to a list for eventual purchase 801. In other embodiments multiple users may add merchandise to a list for purchase.

A user then enters a merchant shop 802. The map of the location will be displayed 803 as described herein. In one embodiment the map will automatically display. In another embodiment the merchant shop will be selected then the map will be displayed.

A user will then select the type of shopping to be done 804. In one embodiment the user will select quick shop 805. The map will then populate with a best route for the items on the associated list for the shop 808. In another embodiment the user will select general shop 806. The items from the list associated with that merchant shop will then be displayed 809. In yet another embodiment the user will select casual shop 807. In this embodiment the application will display the list for the associated shop 810.

While items with associated deals and coupons are displayed in the lists when a user is ready to checkout, coupons will be displayed again 811. This will allow a user to have the coupons scanned and applied at checkout. This step and feature allows a user to have all coupons electronically stored and used. At this point a user will check out 812 purchasing the desired items. The user will then leave the merchant shop and the method ends 813.

Figure 9:
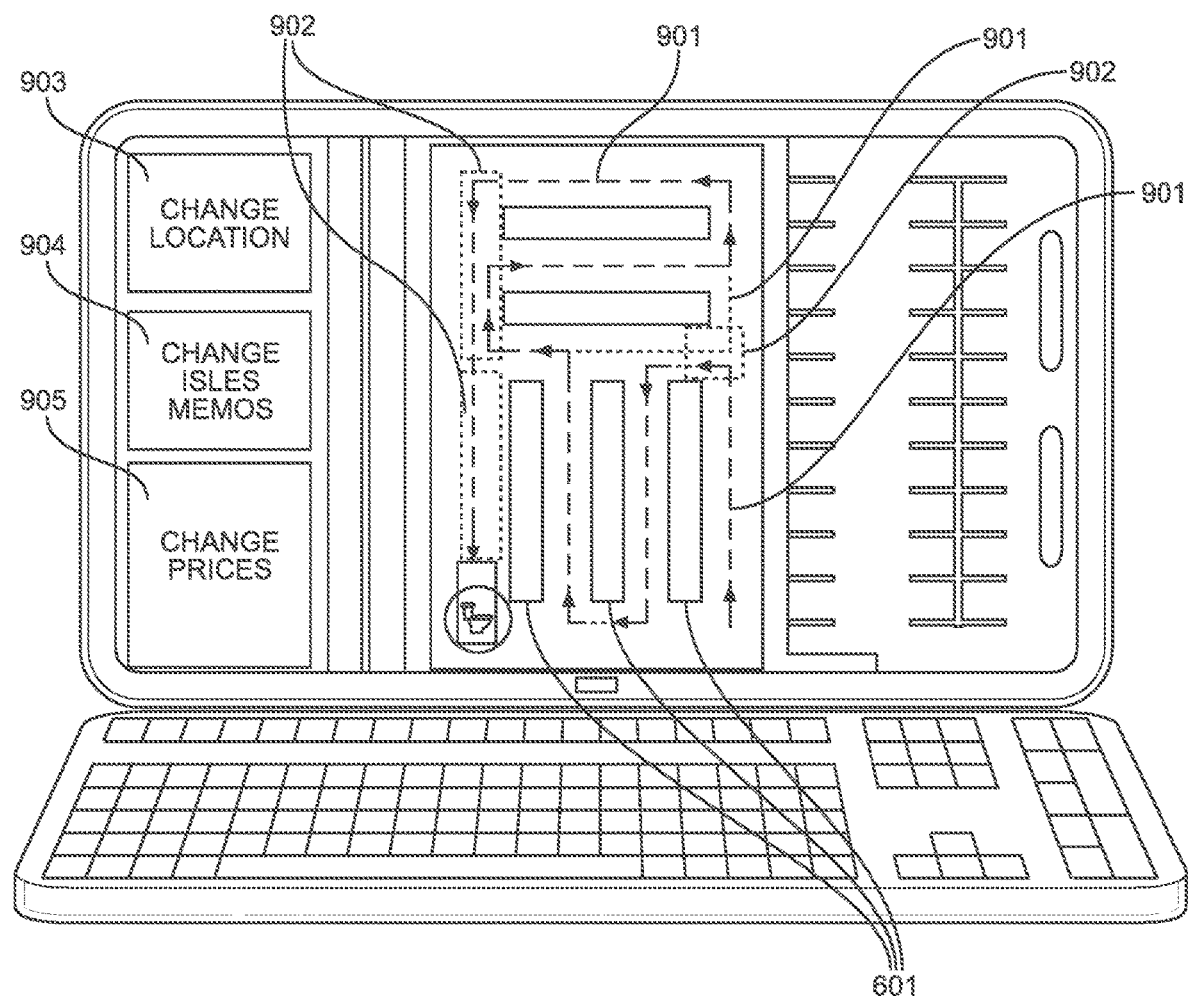
FIG. 9 shows a top down view of an embodiment of the fatal for the location application used by a store merchant.

Referring now to FIG. 9, there is shown a top down view of an embodiment of the GUI for the location application used by a store merchant. In one embodiment there is a merchant feature. The merchant feature show the paths 901 different consumers take through a store. The different paths 901 will be tracked and recorded. A merchant will then be able to monitor this data to determine how consumers move through the store.

In some embodiments the different paths have different representations. For example, the highest used path may have an arrow path. Other less used paths will have other markings. In further embodiments the highest trafficked areas will have a highlighted marking 902. This will allow a store owner to immediately see the most trafficked areas 902. This will allow a store owner to know how to best locate their products for sale.

In some embodiments there will be additional merchant controls. In on embodiment the merchant will be able to change item locations manually 903. In another embodiment the merchant will have the ability to label isles. This is shown by change isles memos 904. In yet a further embodiment the merchant will be able to use the merchant hub to change item prices within the application 905.

Figure 10:
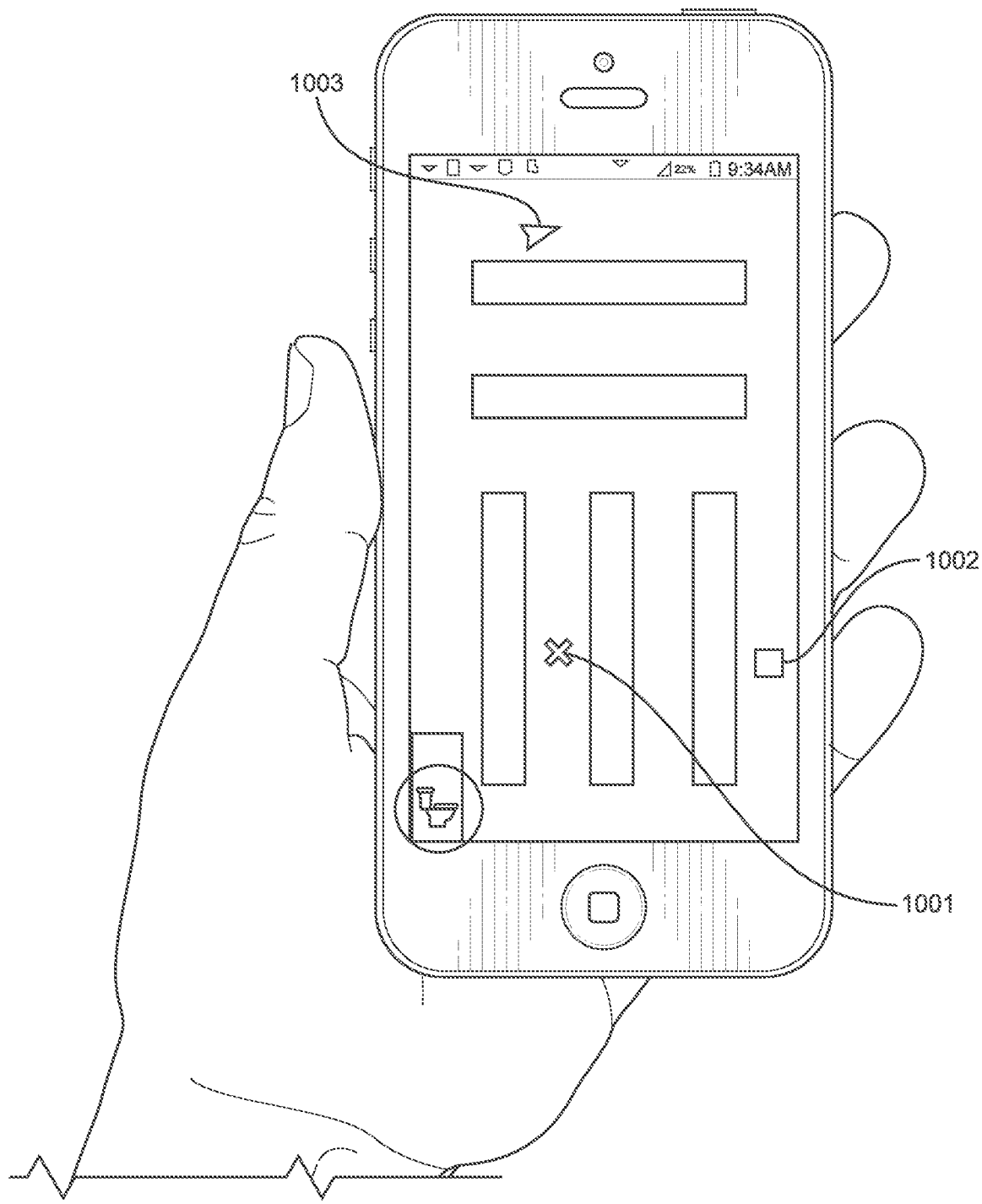
FIG. 10 shows a top down view of an embodiment of the GUI for the location application marking locations of users.

Referring now to FIG. 10 there is shown, a top down view of an embodiment of the GUI for the location application marking locations of users. In one embodiment users will be able to share their locations. In a one version of this embodiment users will be displayed for all users to see. In a further embodiment, users will one be displayed to other users they wish to be seen by.

In one embodiment a user will be displayed 1003 as a directional arrow. This will allow a user to determine their own location as well as direction of travel. Further, a user they are sharing location with will be displayed as a different shape. In the shown embodiment the additional user is represented by a square 1002. In yet another embodiment user's will be able to set a meeting location 1001. This location will appear on the desired users screen and be distinct to show a location for meeting.

In other embodiments this application may be used in a variety of languages and in a variety of settings. This application should not be limited to the disclosure of uses in this specification.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A listing and location application, the application comprising:
    a mobile device having a processor operably connected to a memory;
    wherein the memory stores an application to be run by the processor of the mobile device;
    the application comprises a listing function, wherein a list of products is entered and stored;
    a location program that displays localized locations within the application;
    wherein the location program will display locations of interest; and
    wherein the location program will redact specified locations;
    a correlation system that will receive a location from a GPS system and display a correlated map.

2. The listing and location application of claim 1, further comprising the ability to share lists with a cloud storage system.

3. The listing and location application of claim 2, wherein different allowed users have access to the lists.

4. The listing and location application of claim 1, wherein the localized map shows areas of interest.

5. The listing and location application of claim 1, wherein the localized map shows product locations based on the list.

6. A method for a listing and location application, the method comprising:
    listing products;
    receiving a location from a GPS system;
    activating a merchant shop map, wherein the merchant shop map displays places of interest and redacted area;
    displaying product location, wherein the products are those on the list.

7. The method for a listing and location application of claim 6, further comprising searching for coupons relating to the products added to the list.

8. The method for a listing and location application of claim 6, further comprising calculating a best route through the merchant shop to collect the listed products;
    displaying the best route on the product location display.

9. The method for a listing and location application of claim 6, further comprising associating the list with a specific merchant shop.

10. The method for a listing and location application of claim 6, further comprising sharing the list with an allowed party.

11. The method for a listing and location application of claim 6, further comprising recording the path through a specific merchant shop.

12. The method for a listing and location application of claim 11, further comprising, displaying a correlation of traffic through a merchant shop to an allowed user.

13. The method for a listing and location application of claim 6, further comprising receiving a search request to locate a specific item and displaying the location of the searched item.

* * * * *